United States Patent
Sun

(10) Patent No.: US 8,423,071 B1
(45) Date of Patent: *Apr. 16, 2013

(54) RESUMING MEDIA OBJECTS DELIVERED VIA LIVE STREAMING SERVICES UPON DATA REDUCTION EVENTS

(75) Inventor: Yaojun Sun, South Riding, VA (US)

(73) Assignee: Sprint Communications Company L.P., Overland Park, KS (US)

(*) Notice: Subject to any disclaimer, the term of this patent is extended or adjusted under 35 U.S.C. 154(b) by 1049 days.

This patent is subject to a terminal disclaimer.

(21) Appl. No.: 12/323,263

(22) Filed: Nov. 25, 2008

(51) Int. Cl.
*H04B 7/185* (2006.01)
*H04B 7/00* (2006.01)
*G06F 3/00* (2006.01)
*G06F 15/16* (2006.01)

(52) U.S. Cl.
USPC ............... 455/522; 370/318; 710/29; 710/15; 710/30; 710/33; 709/217; 709/238

(58) Field of Classification Search .................. 370/318; 455/522; 710/29, 15, 30, 33; 709/217, 238
See application file for complete search history.

(56) References Cited

U.S. PATENT DOCUMENTS

| | | | |
|---|---|---|---|
| 5,925,102 A * | 7/1999 | Eilert et al. ................... | 709/226 |
| 6,477,542 B1 * | 11/2002 | Papaioannou ........................ | 1/1 |
| 6,973,667 B2 * | 12/2005 | Fritsch ............................. | 725/88 |
| 6,996,129 B2 * | 2/2006 | Krause et al. ................. | 370/487 |
| 7,064,657 B2 | 6/2006 | Becker et al. | |
| 7,139,813 B1 * | 11/2006 | Wallenius ..................... | 709/219 |
| 7,191,233 B2 | 3/2007 | Miller | |
| 7,206,559 B2 | 4/2007 | Meade, II | |
| 7,804,856 B2 * | 9/2010 | Krause et al. ................. | 370/486 |
| 7,889,697 B2 * | 2/2011 | Chen et al. ..................... | 370/331 |
| 8,032,671 B1 * | 10/2011 | Sun ................................. | 710/29 |
| 8,086,091 B2 | 12/2011 | Sotomaru | |
| 2002/0083438 A1 * | 6/2002 | So et al. .......................... | 725/31 |
| 2003/0128664 A1 * | 7/2003 | Connor ......................... | 370/229 |
| 2003/0152044 A1 * | 8/2003 | Turner .......................... | 370/328 |
| 2004/0176157 A1 | 9/2004 | Walker et al. | |
| 2006/0015580 A1 * | 1/2006 | Gabriel et al. ................. | 709/219 |
| 2006/0089843 A1 * | 4/2006 | Flather .............................. | 705/1 |
| 2007/0058534 A1 * | 3/2007 | Shimonishi et al. .......... | 370/230 |
| 2008/0152322 A1 | 6/2008 | Onoda | |
| 2008/0162666 A1 * | 7/2008 | Ebihara et al. ................ | 709/217 |
| 2008/0310439 A1 * | 12/2008 | Gale et al. ..................... | 370/412 |
| 2009/0103565 A1 * | 4/2009 | Matsui .......................... | 370/470 |
| 2010/0115568 A1 * | 5/2010 | Gupta et al. .................. | 725/106 |
| 2011/0197057 A1 | 8/2011 | Koch | |
| 2011/0239024 A1 * | 9/2011 | Hsieh et al. ................... | 713/323 |

OTHER PUBLICATIONS

Non Final OA mailed Mar. 12, 2012 in U.S. Appl. No. 12/235,792, 33 pp.

(Continued)

*Primary Examiner* — Bobbak Safaipour

(57) ABSTRACT

Systems, methods, and computer-readable media for resuming a media object presented on a mobile device following a data loss event that interrupts the presentation of the media object, wherein live streaming services are used to deliver the media object are provided. During presentation of the media object, a reduced data rate at which data is communicated to the mobile device is observed. The reduced data rate interrupting the presentation of the media object. An indication to pause delivery of the media object to the mobile device is provided. A preferred data rate at which data is communicated to the mobile device is observed and, thereafter, an indication to resume delivery of the media object to the mobile device is communicated.

20 Claims, 5 Drawing Sheets

OTHER PUBLICATIONS

Non Final OA mailed Feb. 16, 2011 in U.S. Appl. No. 12/977,171, 9 pp.
Office Action, mailed Mar. 31, 2010, in U.S. Appl. No. 12/114,534, 11 pages.
Notice of Allowance, mailed Sep. 9, 2010, in U.S. Appl. No. 12/114,534, 6 pages.
1-Mo. OA, mailed Jul. 26, 2011, in U.S. Appl. No. 12/363,702, 15 pp.
Notice of Allowance, mailed May 17, 2011, in U.S. Appl. No. 12/977,171, 6 pages.
1-Mo. OA, mailed Nov. 28, 2011, in U.S. Appl. No. 12/363,702, 10 pp.
1-Mo. OA, mailed Oct. 4, 2011, in U.S. Appl. No. 12/235,792, 13 pp.
Final OA mailed Oct. 16, 2012 in U.S. Appl. No. 12/235,792, 41 pp.

* cited by examiner

RESUMING MEDIA OBJECTS DELIVERED VIA LIVE STREAMING SERVICES UPON DATA REDUCTION EVENTS

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief, this disclosure describes a way for pausing and resuming delivery of media to a mobile device to avoid disruptions in presenting the media due to wireless connectivity issues. Our technology observes wireless connectivity issues and, thereafter, pauses delivery of the media object. Upon overcoming any wireless connectivity issues, delivery of the media object resumes such that a user can continue their user experience.

In embodiments, one or more computer-readable media having computer-executable instructions embodied thereon that, when executed, perform a method for resuming a media object presented on a mobile device following a data reduction event that interrupts the presentation of the media object, wherein a live streaming service is utilized to deliver the media object to the mobile device via a live streaming service is provided. During the presentation of the media object, a reduced data rate at which data is communicated to the mobile device is observed. The reduced data rate interrupts the presentation of the media object. An indication to pause delivery of the media object to the mobile device is provided. A preferred data rate at which data is communicated to the mobile device is observed. An indication to resume delivery of the media object to the mobile device is communicated.

In other embodiments, one or more computer-readable media having computer-executable instructions embodied thereon that, when executed, perform a method for resuming a media object presented on a mobile device following a data reduction event that interrupts the presentation of the media object, wherein a live streaming service is utilized to deliver the media object to the mobile device is provided. Upon receiving an indication to pause delivery of the media object, delivery of the media object to the mobile device is paused. A capacity of a storage queue is increased to accommodate storage of a portion of the media object received while delivery of the media object to the mobile device is paused. An indication to resume delivery of the media object to the mobile device is received. The indication including a point within the media object at which to resume delivery. The media object is communicated in accordance with the indication to resume delivery of the media object.

In still further embodiments, a set of computer-useable instructions provide a method for resuming a media object presented on a mobile device following a data reduction event that interrupts the presentation of the media object, wherein a live streaming service is utilized to deliver the media object to the mobile device is provided. A first set of one or more media packets containing media data associated with the media object are communicated from a network pause node to the mobile device. The first set of one or more media packets are provided by a live media source that delivers the media object in a continuous stream beginning at a predetermined time. A pause request is received from the mobile device that provides an indication to pause delivery of the media object. The mobile device communicates the pause request upon recognizing a reduced data rate at which data is communicated to the mobile device that is below a data rate required to adequately support the presentation of the media object. Based on the pause request, delivery of a second set of one or more media packets containing media data associated with the media object is paused, the second set of the one or more media packets is stored within a storage queue of the network pause node, and a size of the storage queue is increased to accommodate additional media packets received by the network pause node. A resume request is received from the mobile device that provides an indication to resume delivery of the media object to the mobile device. The mobile device communicating the resume request to the network pause node upon a completion of the reduced data rate. The resume request including an indication of a point at which to begin communicating the media object. Based on the resume request, resuming delivery of the media object by communicating the second set of the one or more media packets to the mobile device so that the mobile device can present the media object at the point at which it was interrupted.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

Figure 1:
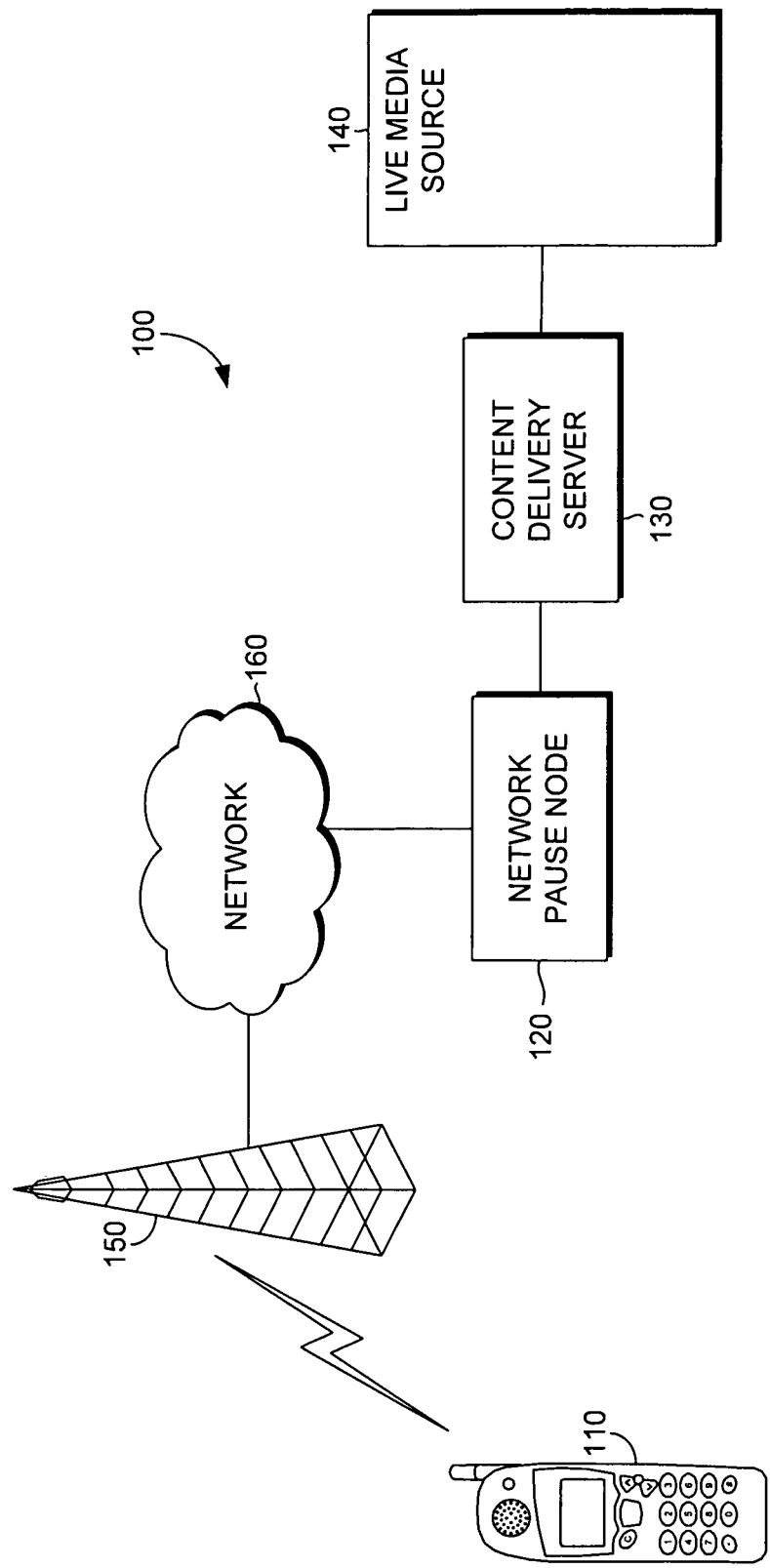
FIG. 1 is a block diagram of an exemplary computing system for resuming media objects upon data reduction events, in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3G | Third-Generation Wireless Telephone Technology |
| 4G | Fourth-Generation Wireless Telephone Technology |
| CDMA | Code Division Multiple Access |
| CD-ROM | Compact Disk Read Only Memory |
| CST | Central Standard Time |
| DAP | Digital Audio Player |
| DVD | Digital Versatile Discs |
| EEPROM | Electrically Erasable Programmable Read Only Memory |
| FIFO | First In, First Out |
| HTTP | Hypertext Transfer Protocol |
| IP | Internet Protocol |
| GPRS | General Packet Radio Service |
| GSM | Global System for Mobile Communications |
| iDEN | Integrated Digital Enhanced Network |
| LIFO | Last In, First Out |
| MMS | Microsoft Media Server |
| MP3 | MPEG-1 Audio Layer 3 |
| PC | Personal Computer |
| PCS | Personal Communications Service |
| PDA | Personal Digital Assistant |
| PMP | Portable Media Player |
| PNM | Progressive Networks Media |
| PVP | Portable Video Player |
| RAM | Random Access Memory |
| ROM | Read Only Memory |
| RTMP | Real Time Messaging Protocol |
| RTSP | Real Time Streaming Protocol |
| RTSPT | RTSP using TCP |
| RTSPU | RTSP using UDP |
| TCP | Transmission Control Protocol |
| TDMA | Time Division Multiple Access |
| UDP | User Datagram Protocol |
| UMTS | Universal Mobile Telecommunications System |
| WiMAX | Worldwide Interoperability for Microwave Access |

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention relate to systems, methods, and computer-readable media for pausing and resuming media objects upon data reduction events that interrupt the presentation of the media objects when live streaming services are utilized to deliver the media objects to a mobile device. A media object, as used herein, refers to any media content including, but not limited to, television shows, videos, songs, movies, games, any other type of visual or audio media content, or portions thereof. As such, a media object can be, for example, an audio media object, a video media object, a combination thereof, or the like.

Live streaming services can be utilized to deliver media objects to mobile devices, such as a mobile phone. A live streaming service refers to a service that delivers a media object at a set time (e.g., a live broadcast feed). That is, a media source provides a particular media object at a specific time. For example, a television network, such as CBS, might provide a broadcast feed of a weather report at 6:00 p.m. CST. A live broadcast feed might be a real-time presentation that is presented in real-time in association with a live event (e.g., an emergency weather report being presented live or a sporting event being presented live or in real-time) or a pre-programmed presentation (e.g., a weather report recorded in advance of being presented). In embodiments, a media object is distributed to multiple mobile devices at the same time. With live streaming services, media data corresponding with a media object is generally transmitted in a continuous stream to a mobile device that begins playing the media object upon receiving a small amount of media data (i.e. data associated with a media object). The mobile device continues to receive media data associated with a media object in advance of being output by the mobile device. The media data received by the mobile device can be stored in a buffer or memory. As such, in embodiments, the media data is not stored permanently in the device hardware.

While a media object is being presented (e.g., audio and/or video playback) via a mobile device, data reduction events oftentimes occur. A data reduction event, as used herein, refers to data being transmitted to a mobile device at a data rate (e.g., a raw bit rate represented as kilobits per second) below or under a data rate required to support live streaming (e.g., a required data rate represented as kilobits per second). That is, a data reduction event occurs when data is transmitted at a reduced data rate (e.g., a lower or nonexistent data rate as compared to a required data rate) including instances when data is not successfully transmitted, for example, due to a physical disconnection. In one embodiment, a data reduction event occurs immediately upon the existence of a reduced data rate. In an alternative embodiment, a data reduction event occurs upon a reduced data rate exceeding a threshold (e.g., a time, a quality, or a quantity threshold). For example, a data reduction event might occur after data is unsuccessfully transmitted or transmitted at a reduced data rate for a predetermined amount of time (e.g., five seconds). By way of further example, a data reduction event might occur after data is transferred at a data rate under a specific percentage of the required data rate.

Generally, live streaming services require or prefer a particular data rate to support delivery and/or presentation of a media object. Such a required or preferred data rate might vary, for example, depending on the type of network used to transmit data. For example, a 3G network might require 300 kilobits per second, and a 4G network might require 700 kilobits per second to support live streaming. The occurrence of a data reduction event generally results in media data not being received by a mobile device or being discarded prior to being used to present the media. As such, a data reduction event oftentimes interrupts the delivery and/or presentation of a media object. That is, in instances where a live streaming service is utilized to deliver a media object to a mobile device, the occurrence of a data reduction event can interrupt the presentation of the media object. By way of example only, assume a media source is used to deliver a media object to a mobile device for audio and/or video playback to a user. Upon a data reduction event, the media source might continue sending data packets to the mobile device, but such packets might not be received by the mobile device. Accordingly, the packets are lost and the presentation of the media object is interrupted. To play a media object without interruption, media data should be transmitted in accordance with the required data rate (e.g., 300 kilobits per second for a 3G network and 700 kilobits per second for a 4G network).

In embodiments, a data reduction event occurs in instances a network does not enable data to be transmitted in accordance with the required data rate. By way of example only, such a data reduction event might occur due to a decrease in or lack of radio coverage, a radio condition, a hardware condition, a mobile device location (e.g., distance of a mobile device to a transceiver tower), an environmental condition, a loss of a physical connection, variations thereof, or the like. Such conditions might prevent media data from being delivered to a mobile device or from being delivered to a mobile device at an acceptable data rate (i.e., transmitting data at or above the required data rate).

As previously set forth, embodiments of the present invention relate to systems, methods, and computer-readable media for pausing and resuming media objects upon data reduction events that interrupt the delivery and/or presentation of the media objects, wherein live streaming services are utilized to deliver the media objects to mobile devices presenting the media objects. By way of example only, assume that a portion of a media object is delivered to a mobile device via live streaming services and, as such, the mobile device begins to present the media object. Further assume that a data reduction event occurs and interrupts delivery and presentation of the media object. Embodiments of the present invention enable the pause and later resumption of the delivery and/or presentation of the media object at substantially the same position at a later instance as though no interruption (e.g., data reduction event) occurred. That is, following a data reduction event, a media object can continue to be delivered and/or presented at the point it was interrupted when the data reduction occurred. As such, a user experience can continue without missing a portion of the media object.

Referring to the drawings generally, and initially to FIG. 1 in particular, an exemplary communications network for practicing an embodiment of the present invention is provided and designated generally by numeral 100. As shown in FIG. 1, an exemplary communications network 100 includes a mobile device 110, a network pause node 120, a content delivery server 130, and a live media source 140. Generally, in embodiments, the live media source 140 provides a media object being broadcasted live (i.e., presentation at a set time) to the content delivery server 130. The content delivery server 130 delivers the media object to the network pause node 120. The network pause node 120 stores the media object and communicates the media object to the mobile device 110 for presentation to a user. Upon a data reduction event occurring during transmission of the media object, the mobile device 110 and the network pause node 120 communicate with one another to pause and/or resume delivery of the media object.

The mobile device 110 of FIG. 1 can be any computing device that communicates by way of a wireless network (e.g., a wireless telecommunications network) and is capable of presenting media objects. As such, the mobile device 110 may take on a variety of forms, such as a personal computer (PC), a laptop computer, a mobile phone, a personal digital assistant (PDA), a portable media player (PMP), or any other mobile device that is capable of presenting media objects as described herein. A portable media player (PMP) device may include, without limitation, a portable video player (PVP) and/or a digital audio player (DAP), such as a MP3 player. Accordingly, a mobile device 110 that is capable of presenting media objects may be variously referred to herein as a device, a client device, a media device, a portable media device, a portable media player, a media player, a media-playing device, and the like. Makers of illustrative mobile devices include, for example, Research in Motion®, Creative Technologies Corp., Samsung®, Apple® Computer, and the like. A mobile device can include, for example, a display(s), a power source(s) (e.g., a battery), a data store(s), a speaker(s), memory, a buffer(s), and the like.

The mobile device 110 communicates by way of a wireless transceiver, depicted by numeral 150. A wireless transceiver serves as a transceiver for wireless communications between the mobile device 110 and a network. Examples of wireless transceivers include, but are not limited to, a base station transceiver and a Node B. Additional examples of wireless transceivers include Wi-Fi and WiMAX compatible transceivers. In embodiments, the wireless transceiver 150 is considered a component of a wireless telecommunications network to which the mobile device 110 communicates.

A network is depicted generally by the numeral 160. The network 160 is a wireless network. In one embodiment, the network is a wireless telecommunications network. A wireless telecommunications network refers to any type of telecommunications network that is wireless. Examples of a wireless telecommunications technologies that are compatible with the network 160 include, but are not limited to, Global System for Mobile Communications (GSM), General Packet Radio Service (GPRS), Code Division Multiple Access (CDMA), CDMA2000, CDMAOne, Time Division Multiple Access (TDMA), Universal Mobile Telecommunications Systems (UMTS), Integrated Digital Enhanced Network (iDEN), WiMAX, 3G, 4G, and Personal Communications Service (PCS). A wireless telecommunications network might include an array of devices, which are not shown so as to not obscure more relevant aspects of the invention. Components such as a base station, a communications tower, or even access points (as well as other components) can provide wireless connectivity in some embodiments. Network 160 can include multiple networks, as well as being a network of networks, but is shown in more simple form so as to not obscure other aspects of the present invention. Although single components are illustrated for clarity, one skilled in the art will appreciate that network 160 can enable communication between multiple mobile devices, network pause nodes, content delivery servers, and/or live media servers.

Initially, the mobile device 110 requests a media object such that the media object can be presented via the mobile device. That is, the mobile device 110 generates and communicates a media request. A media request refers to a data packet that includes a request for a media object, for example, to be delivered, received, and/or presented via a live streaming service. In embodiments, such a media request is communicated to the network pause node 120 via network 160. Communications between the mobile device 110 and the network pause node 120 can use any protocol. For example, in one embodiment, communications between the mobile device 110 and the network pause node 120 might use a protocol such as RTSP and/or HTTP. RTSP might include the use of TCP (i.e., RTSPT) and/or UDP (i.e., RTSPU). In another embodiment, communications between the mobile device 110 and the network pause node 120 might use another streaming protocol, such as RTMP, PNM, MMS, or the like.

In one implementation, the media request includes a live streaming service instruction and/or a media object identifier to identify the media object desired to be delivered, received, and/or presented. A live streaming service instruction can identify a live streaming service or a live media source for use in providing a media object. A media object identifier refers to any identifier that identifies a particular media object. Such a media object identifier can be utilized to reference or obtain the desired media object. A media object identifier might be, for example, a number, a title, a label, an icon, an artist, a symbol, an image, a link, or any other feature that can identify a media object. One skilled in the art will appreciate that a media request can also include any other information that might be used to communicate the media request (e.g., header information), identify the media object or source thereof, or the like.

Such a media request can be generated and/or communicated upon mobile device 110 detecting an indication to initiate the delivery, presentation, and/or reception of a media object. In one embodiment, an indication to initiate a media object is provided by a user of the mobile device 110. In such an embodiment, a user might navigate to a desired media object identifier and provide an indication (e.g., select a media object identifier) to initiate the delivery, presentation, and/or reception of the media object. For example, a user can navigate to "Video 1" and select to play "Video 1." A user can select a media object identifier by, for example, double-clicking on a media object identifier, right-clicking on a media object identifier, hovering over a media object identifier, dragging and dropping a media object identifier, providing an audio command, selecting a media object identifier via a touch screen, or the like. In an alternative embodiment, an indication to initiate the delivery, presentation, and/or reception of a media object is automatically provided. In such an embodiment, the indication to initiate a media object might be automatically provided based on the occurrence of an event, such as, for example, initiating a media player or a media browser, navigating to a website, or the like.

The mobile device 110 also receives communications, for example, from the network pause node 120. Such communications include, for example, media responses and media objects or media data associated therewith. A media response refers to a packet communicated in response to a media request that indicates a receipt or a confirmation of the media request and/or indicates that the request can be fulfilled. Media data refers to any data associated with a media object, or a portion thereof, including, for example, media content, information associated with media content or the delivery thereof, etc. Media data can be communicated to the mobile device 110 via a media packet that includes, for example, a header and media content (e.g., one or more frames). The media data enables the presentation of a media object on a mobile device. In embodiments, the media data received by the mobile device 110 might be temporarily or momentarily stored in a buffer or memory of the mobile device 110.

Upon receiving at least a portion of a media object or media data associated therewith, the mobile device 110 presents or outputs (e.g. audio or video playback) the media object, or a portion thereof. In some embodiments, the mobile device 110 utilizes a display screen associated with (e.g., coupled with) the mobile device, an audio system associated with the mobile device, or a combination thereof. The media object might be presented as media packets containing media data are received or upon the mobile device 110 receiving a particular amount of media data buffered on the device.

In embodiments, the mobile device 110 detects data reduction events. In one embodiment, a data reduction event is detected upon the mobile device 110 failing to receive media packets or receiving media packets out of sequence. Such occurrences indicate that, for example, a reduced data rate exists and, as such, the mobile device 110 cannot adequately present a particular media object. A data reduction event might be detected immediately upon an occurrence of a reduced data rate. Alternatively, a data reduction event might be detected upon a reduced data rate exceeding a threshold (e.g., a time or time period, a quality, or a quantity threshold). For example, a data reduction event might be detected after media data is transmitted at a reduced data rate for a predetermined amount of time (e.g., five seconds). By way of further example, a data reduction event might be detected after media data is transmitted at a data rate under a specific percentage of the required data rate.

In some cases, to detect data reduction events, the mobile device 110 might obtain the latest or most recently received media packet(s), or information associated therewith. That is, the mobile device 110 might temporarily or momentarily store media packet(s) or information contained within, or associated with, the media packets (e.g., time media packet received, media packet number or other identifier, or the like). Using the latest or most recently received media packet, or information associated therewith, a data reduction event can be detected. For example, a sequence number of a last received media packet can be compared to a sequence number of a subsequently received media packet to identify a data reduction event. By way of further example, a reception time of a last received media packet can be used to identify a data reduction event (e.g., five seconds have lapsed since the last media packet was received). The stored media packet, or information contained therein or associated therewith, can be used to recognize the last media packet received prior to the data loss event so that the media object can be resumed at substantially the same point it was interrupted.

In some embodiments, the mobile device 110 pauses a media object being presented on the mobile device 110. For example, the presentation of a media object might be automatically paused at or near the time of detecting a data reduction event. By way of further example, a user might select to pause the media object via a user interface that is displayed in response to detecting a data reduction event. In an alternative embodiment, the mobile device 110 might continue to present all the media data received by the mobile device 110 until such received media data is exhausted.

The mobile device 110 can, in some embodiments, also initiate a pause of the delivery of a media object, or media data associated therewith, communicated from, for example, the network pause node 120. That is, the mobile device 110 provides an indication to pause (i.e., a pause indicator) delivery of a media object or media data. In some implementations, the mobile device 110 initiates a pause by automatically (i.e., without user intervention) generating and/or communicating a pause request to the network pause node 120 delivering the media object upon an occurrence of a data reduction event. A pause request refers to a data packet that includes an indication to pause delivery of a media object or media data associated therewith. Such a pause request might provide an indication to the network pause node 120 to pause the delivery of media data associated with a media object to the mobile device 110. By way of example only, the mobile device 110 might detect a data reduction event and, thereafter, generate and communicate a pause request to the network pause node 120.

In other implementations, the mobile device 110 initiates a pause of the delivery of a media object, or media data associated therewith, by failing to transmit a connection signal. A connection signal provides an indication that the mobile device 110 is operating normally. In embodiments, a connection signal is transmitted from the mobile device 110 to the network pause node 120 upon the lapse of a time or time period. By way of example only, upon the lapse of a ten second time duration, the mobile device 110 transmits a connection signal to the network pause node 120. If a data reduction event occurs (e.g., a physical disconnection is detected), however, a connection signal is not transmitted to the network pause node 120. Accordingly, failure of a network pause node 120 to receive a connection signal after a particular amount of time provides an indication (i.e., a pause indicator) to the network pause node 120 to pause delivery. Such a connection signal might be utilized in addition to or as an alternative to communicating a pause request when such a pause request cannot be communicated, such as, for example, when a data reduction event occurs due to a physical disconnection.

One skilled in the art will appreciate that, in some embodiments, connection signals are transmitted by the mobile device 110 only in instances when the mobile device 110 is properly connected (e.g., physically connected) with the network pause node 120, the content delivery server 130, the live media source 140, or the like. As such, upon a physical disconnection, the mobile device 110 detects a data reduction event and discontinues transmitting connection signals until the physical connection is reestablished. In other embodiments, connection signals are transmitted in any instance in which the mobile device is capable of transmitting a signal. In such a case, even though connection signals are generally transmitted from the mobile device 110, the network pause node 120 only receives such a connection signal when the mobile device 110 and the network pause node 120 are properly connected so that communication between devices can be completed. Accordingly, the mobile device 110 does not need to detect a data reduction event prior to initiating a pause of the delivery; instead, the inability of the network pause node 120 to receive a connection signal can provide an indication to pause delivery of a media object.

The mobile device 110 can resume the presentation and/or delivery of a media object, or media data associated therewith, at substantially the same point the media object was interrupted as though no interruption occurred (e.g., without missing a portion of the media object). In instances that the presentation of a media object is paused, the mobile device 110 can resume the presentation at the point at which the media object was interrupted or should continue playing.

The mobile device 110 can additionally or alternatively initiate a resume of the delivery of the media object, or media data associated therewith, such that presentation of the media object can resume. That is, the mobile device 110 provides an indication to resume (i.e., a resume indicator) delivery of a media object or associated media data. In some implementations, the mobile device 110 initiates a resume by generating and/or communicating a resume request to the network pause node 120. A resume request refers to a data packet that includes an indication to resume delivery of a media object or media data associated therewith. As such, the mobile device 110 can continue receiving media data associated with a media object, such as a video object or an audio object, so that the media object can be resumed on the mobile device 110. The resume request might include an indication of the last (i.e., most recent) media data or media packet received by the mobile device 110, an indication of the last (i.e., most recent) media data received by the mobile device 110 that meets or exceeds the data rate required to support a streaming service, an indication of a point at which the media object was interrupted by a data reduction event (e.g., packet number of other identifier indicating the last packet that is received or presented prior to pausing the presentation or delivery of the media object), a resuming instruction, and/or a media object identifier to identify the media object desired to be resumed. Such information might be obtained or stored by the mobile device 110 by, for example, obtaining and/or storing at least the last received packet or the last received packet that meets data rate requirements, or information associated therewith.

In addition to or as an alternative to initiating a resume of delivery of a media object or media data via a resume request, a resume of delivery can also be initiated via a connection signal. For example, assume that a network pause node 120 pauses delivery of a media object based on a failure to receive a connection signal within a particular duration of time. Further assume that a data reduction event has completed (e.g., a physical connection is reestablished or data can be transmitted in accordance with the required data rate). In such a case, the mobile device 110 might successfully transmit a connection signal to the network pause node 120 such that the network pause node 120 recognizes such a signal as an indication (i.e., resume indicator) to resume a media object.

Resuming the presentation of the media object and/or initiating resumption of delivery of the media object or media data might automatically occur upon a completion of a data reduction event. For example, assume the mobile device 110 detects an acceptable data rate after a period of a physical disconnection or a reduced data rate (i.e., the data reduction event is completed). In such a case, the mobile device 110 might automatically, without user intervention, resume presentation of a media object and/or generate and communicate a resume request to the network pause node. One skilled in the art will appreciate that an acceptable data rate after a period of a reduced data rate can be detected in any number of ways. For example, a physical connection might be detected upon a successful completion of a communication or signal between the mobile device and the network pause node 120 or another component.

In another embodiment, a user might select, via a user interface, to resume the presentation of a media object and/or initiate the resumption of delivery of a media object. Such a user interface might be automatically presented, or presented upon a user request, by the mobile device 110 after the completion of a data reduction event. In some implementations, the user interface provides a user with an option to resume the currently paused media object. In other implementations, a user may navigate to a media object identifier associated with a media object desired to be resumed. Upon navigating to a desired media object identifier, the user can select to resume a media object. A user can select a media object identifier by, for example, double-clicking on a media object identifier, right-clicking on a media object identifier, hovering over a media object identifier, dragging and dropping a media object identifier, providing an audio command, selecting a media object identifier via a touch screen, and the like. For instance, a user may navigate to "Video 1" and select to resume "Video 1."

The mobile device 110 disconnects from the network pause node 120, the content delivery server 130, the live media source 140, or a combination thereof. To disconnect the mobile device 110, the mobile device 110 might establish or initiate a disconnection (e.g., generate and/or communicate a disconnection packet that indicates or requests a disconnection). In some cases, a disconnection might be established or initiated upon identifying a user indication that indicates or requests a desire to disconnect. For example, in instances that a user interface is provided to a user to enable the resumption of a media object, rather than selecting to resume the media object, the user might select to discontinue the presentation, delivery, or reception of a media object. Alternatively, in some cases, a disconnection packet might be generated and communicated automatically upon the occurrence of an event, such as reception of a last packet associated with a media object or a lapse of a time or time period (e.g., a disconnection occurs upon expiration of a specific amount of time). For example, assume a mobile device is configured to disconnect after the mobile device has been paused for twenty-four hours. In such a case, upon the lapse of the twenty-four hour period, a disconnection packet might be automatically (i.e., without user intervention) generated and communicated to the network pause node 120.

The network pause node 120 is a server or other computing device that enables pausing and resuming a media object based on a data reduction event. In embodiments, the network pause node 120 enables the resumption of a media object following a data reduction event even though the entire media object has not been delivered to the mobile device. Such a network pause node 120 that performs resuming functionality in a live streaming media environment, as more fully described below, enables an enhanced user experience during and following data reduction events (e.g., a user can continue to view a media object at point of interruption). One skilled in the art will appreciate that any number of network pause nodes can be used to communicate with mobile devices and content delivery servers. For example, a single network pause node or multiple network pause nodes can provide support for multiple mobile devices, multiple content delivery servers, or a combination thereof.

In one embodiment, the network pause node 120 is operated by a wireless telecommunications provider that provides wireless telecommunications services. As previously discussed, the network pause node 120 can communicate with the mobile device 110 via network 160. The network pause node 120 is able to communicate with the content delivery server 130 by way of a network, such as, but not limited to an IP network and/or a wireless telecommunications network (e.g., network 160 or other wireless network). An IP network is a computing network that utilizes IP protocol as a network layer protocol. The network may include, without limitation, one or more local networks (LANs) and/or wide area networks (WANs). Such networking environments are commonplace in offices, enterprise-wide computer networks, intranets, and the Internet. Communications between the network pause node 120 and the content delivery server 130 can use any protocol. For example, in one embodiment, communications between the network pause node 120 and the content delivery server 130 might use RTSP, HTTP, or the like. RTSP might include the use of TCP (i.e., RTSPT) and/or UDP (i.e., RTSPU). In another embodiment, communications between the network pause node 120 and the content delivery server 130 might use another streaming protocol, such as RTMP, PNM, MMS, or the like.

The network pause node 120 services the requests of the mobile device 110 by forwarding requests to other components, such as the content delivery server 130. Initially, the network pause node 120 receives a media request, for example, from the mobile device 110. For example, upon a mobile device 110 receiving a user indication to receive and/ or present a media object, a mobile device 110 might generate a media request to be communicated to the network pause node 120. After receiving the media request, the network pause node 120 communicates (e.g., forwards) the media request, or a corresponding media request (e.g., a modified media request), to an appropriate content delivery server, such as the content delivery server 130. In embodiments, the network pause node 120 might identify an appropriate content delivery server to which to direct the media request, cache the media request, and/or modify the media request (e.g., alter the packet header).

The network pause node 120 communicates a media response to a mobile device, such as mobile device 110. In one embodiment, the network pause node 120 receives a media response, for example, communicated from the content delivery server 130, as discussed more fully below. Upon receiving a media response, the network pause node 120 communicates (e.g., forwards) the media response, or a corresponding media response, to an appropriate mobile device. In embodiments, the network pause node 120 might identify an appropriate mobile device to which to direct the media response, cache the media response, and/or modify the media response (e.g., alter the packet header).

The network pause node 120 is configured to obtain media objects, media data associated therewith (e.g., media packets containing media data), or portions thereof. In embodiments, the network pause node 120 receives media data transmitted from a content delivery server, communicates the received media data to an appropriate mobile device, and/or directs the received media data to an appropriate storage location (e.g., data storage initiated for the corresponding media object). In some implementations, media data directed to a mobile device or a storage location might refer to a copy of the media data, the original media data, or information associated therewith. For example, in one embodiment, a copy of the received media data might be generated and directed to an appropriate storage queue within the network pause node 120 and, thereafter, the media data received by the network pause node 120 might be forwarded on to the appropriate mobile device. As the storage queue (e.g., a buffer) might be of a particular size, once the storage queue is at capacity, at least a portion of the media data stored in the storage queue might be dequeued (i.e., removed from the queue) to accommodate additional media data associated with the requested media object.

The network pause node 120 might initiate data storage for media objects, or media data associated therewith, received from a content delivery server, such as the content delivery server 130. That is, the network pause node 120 establishes a data storage location for queuing media data received from a content delivery server. Data storage, as used herein, might refer to any type of temporary, momentary, or permanent computer data storage, such as, for example, memory, RAM, optical discs, magnetic storage, portions thereof, or the like. In one embodiment, network pause node 120 designates or allocates a buffer (i.e., a portion of memory) as a storage location for received media data to temporarily store the data. A buffer can be a FIFO buffer, a LIFO buffer, or the like. The size of such a buffer might vary. For example, the size of the buffer might be dynamically based on a size of the requested media object. In embodiments, when the delivery of media data is paused, the buffer size increases so that additional media data associated with a media object can accumulate and be available for transmission to the mobile device. The size or capacity of the buffer might be based on an algorithm or a lookup system. As such, the capacity of the buffer might be dynamically established so that it can support storage of a media object as necessary for one or more users. An algorithm might control when and an amount to increase or decrease the size of the buffer. By increasing the size of the buffer, more users might be able to utilize the content stored within the buffer.

A storage location might be established for media data associated with a particular media object. For example, a first buffer might be initiated for media data associated with a first media object while a second buffer might be initiated for media data associated with a second media object. Alternatively, a storage location might be established for media data associated with multiple media objects.

In one embodiment, network pause node 120 initiates a data storage for a media object upon receiving a media request. By way of example only, assume the network pause node 120 receives a media request for a particular media object. Upon receiving the media request, the network pause node 120 might initiate or establish a buffer for media data associated with the media object. As such, when the network pause node 120 receives the corresponding media data, such media data is queued within the designated buffer. One skilled in the art will appreciate that initiation of data storage can automatically occur at any time, such as, for example, upon receiving the first media data associated with the media object, before or after communicating the media request to the content delivery server, or the like. Further, initiating data storage for media data can occur any number of times (e.g., a single instance for a single media object or multiple media objects, multiple instances for a single media object or multiple media objects, or the like).

Storing media data within a storage queue of the network pause node 120 enables delivery of the media object, or a portion thereof, to other mobile devices. For example, assume that a first mobile device requests a media object and that media data associated therewith is being temporarily stored in a buffer of a network pause node. Further assume that, at a later time, a second mobile device requests to present the same media object. In such a case, even though a live broadcast has begun, the second mobile device can begin receiving the portion being stored in the buffer. That is, even if the second device requests to present the media object after the live video broadcast started, a user can view at least a portion of the video that has already been broadcast. The amount of the media object available for delivering and presenting at a time after the initial live broadcast can vary depending on the size of the buffer. Because the media data is stored at the network pause node 120 and available for delivery to a second device, a media request received from the second device does not need to be communicated to a content delivery server 130 and/or a live media source 140. Rather, the network pause node 120 can fulfill the request.

The network pause node 120 pauses the delivery of a media object or media data associated therewith. Upon identifying an indication to pause delivery of a media object (e.g., a pause indicator), the network pause node 120 pauses delivery of the media object. In embodiments, the network pause node 120 automatically pauses the delivery of media data of a media object in response to receiving a pause request. By way of example only, upon receiving a pause request communicated from a mobile device, the network pause node 120 automatically pauses the delivery of the media data from the network pause node 120 to the mobile device. In other embodiments, the network pause node 120 automatically pauses delivery of media data in response to recognizing that a connection signal has not been received from a mobile device for a particular amount of time. For example, assume a connection signal is communicated from a mobile device every ten seconds. Further assume that more than ten seconds has elapsed since the network pause node 120 last received a connection signal. In such a case, the network pause node 120 automatically pauses delivery of the media data associated with a media object. In some implementations, although the network pause node 120 pauses delivery of media data to the mobile device, the network pause node 120 continues receiving and storing any media packets received from the content delivery server 130. As previously discussed, the size of the storage queue of the network pause node 120 can increase when delivery of media data associated with a media object is paused.

The network pause node 120 resumes delivery of a media object, or media data associated therewith, at substantially the same point the media object was interrupted as though no interruption occurred. The network pause node 120 might be configured to resume delivering a media object upon identifying an indication to resume (i.e., a resume indicator) a media object. In one embodiment, the network pause node 120 receives a resume request transmitted by a mobile device that requests resumption of delivery of a media object. Such a resume request provides an indication to resume delivery of media data associated with a media object and might include an indication of the last packet received by the mobile device, the next packet for the network pause node 120 to transmit, a resume instruction, a media object identifier, or the like, so that the network pause node 120 can identify the packet at which to begin transmitting to the mobile device. By way of example only, after receiving a resume request to resume delivery of a media object, the network pause node 120 might automatically, without use intervention, resume delivery of the media data associated with the media object to a mobile device. In other embodiments, the network pause node 120 automatically resumes delivery of media data in response to recognizing that a connection signal has been received from a mobile device. In addition, upon receiving a resume request or a connection signal from a mobile device, the network pause node 120 can be configured to dequeue or initiate a dequeue of stored media data. For example, a dequeue of media data might begin with the media packet identifier that matches the packet identifier indicated in the media resume request.

The network pause node 120 can disconnect from the mobile device 110, the content deliver server 130, the live media source 140, or a combination thereof. To disconnect, the network pause node 120 might establish a disconnection or initiate a disconnection (e.g., generate and communicate a disconnection packet that indicates or requests a disconnection). In some cases, a disconnection might be established or initiated upon detecting an indication to disconnect. For example, in instances where a user interface is provided to a user to enable the resumption of a media object, rather than selecting to resume the media object, a user might select to discontinue the reception of the media object. In such a case, a disconnection packet might be communicated, for example to the content delivery server 130, after the network pause node 120 receives an indication to disconnect. Alternatively, in some cases, a disconnection might be established or initiated upon the occurrence of an event, such as reception of a last packet associated with a media object or a lapse of a time or time period (e.g., a disconnection occurs upon expiration of a specific amount of time). For example, assume a network pause node is configured to disconnect after the network pause node has been paused for twenty-four hours. In such a case, upon the lapse of the twenty-four hour period, a disconnection packet might be generated and communicated to the content delivery server 130.

The content delivery server 130 is a server or other computing device that delivers media objects or media data associated therewith. It can be appreciated that any number of content delivery servers can be used to communicate with network pause nodes and live media sources. For example, a single content delivery server or multiple content delivery servers can provide support for multiple network pause nodes, multiple live media sources, or a combination thereof. In one embodiment, the content delivery server 130 is operated by a wireless telecommunications provider that provides wireless telecommunications services.

As previously discussed, the content delivery server 130 communicates with the network pause node 120 via a network. In addition, the content delivery server 130 is able to communicate with the live media source 140 by way of a network (e.g., the same network or a different network than the network used for communication between the network pause node 120 and the content delivery server 130), such as, but not limited to an IP network and/or a wireless telecommunications network (e.g., network 160 or other wireless network). The network may include, without limitation, one or more local networks (LANs) and/or wide area networks (WANs). Such networking environments are commonplace in offices, enterprise-wide computer networks, intranets, and the Internet. Communications between the content delivery server 130 and the live media source 140 can use any protocol. For example, in one embodiment, communications between the content delivery server 130 and the live media source 140 might use RTSP, HTTP, or the like. In another embodiment, communications between the content delivery server 130 and the live media source 140 might use another streaming protocol, such as RTMP, PNM, MMS, or the like.

The content delivery server 130 receives a media request, for example, from the network pause node 120 that requests one or more media objects. The content delivery server 130 can provide a media response to the network pause node 120 indicating that the media request was received and/or that the request can be fulfilled. In one embodiment, the content delivery server 130 communicates the media request, or a corresponding media request, to the live media source 140 and receives a media response from the live media source 140. Communicating a media request to the live media source 140 might occur in embodiments in which a live media source delivers a media object in accordance with a media request for the media object. In an alternative embodiment, the live media source 140 provides a media object to the content delivery server 130 despite a media request. That is, the live media source 140 automatically delivers a media object to the content delivery server 130 when a live broadcast occurs even though there is not a request for the particular media object.

The content delivery server 130 delivers a media object or media data associated therewith to the network pause node 120. Such a content delivery server 130 might deliver a media object in response to a media request received from a network pause node or in accordance with a live broadcast. In embodiments, the content delivery server 130 might reference or retrieve media data associated with the media object requested. The media object might be communicated to the network pause node 120 in a continuous stream, for example, as the media object is received from a live media source. The content delivery server 130 can identify an appropriate one or more network pause nodes to which the media data should be directed.

The content delivery server 130 can disconnect from the mobile device 110, the network pause node 120, the live media source 140, or a combination thereof. To disconnect, the content delivery server 130 might establish a disconnection or initiate a disconnection (e.g., generate and communicate a disconnection packet that indicates or requests a disconnection). In some cases, a disconnection might be established or initiated upon detecting an indication to disconnect. For example, the content delivery server 130 might receive a disconnection packet from the network pause node 120 that indicates a desire to disconnect. Alternatively, in some cases, a disconnection packet might be established or initiated upon the occurrence of an event, such as reception of a last packet associated with a media object or a lapse of a time or time period (e.g., a disconnection occurs upon expiration of a specific amount of time). For example, assume a content delivery server is configured to disconnect after the content delivery server has not delivered media data within five minutes. In such a case, upon the lapse of the five minute period, the content delivery server might disconnect from the network pause node and/or generate and communicate a disconnection packet to a live media source.

The live media source 140 is a server or other computing device that provides media objects or media data associated therewith. It can be appreciated that any number of live media sources can be used to communicate with content delivery servers. For example, multiple live media sources can provide media objects to one or more content delivery servers. In one embodiment, the live media source 140 is operated by or associated with a live media provider. A live media provider is an entity that broadcasts, simulcasts, or provides live streaming media (e.g., streaming media provided at a set time). Examples of live media providers include television stations, video distributors, audio distributors, and other entities that provide streaming media.

As previously discussed, the live media source 140 communicates with the content delivery server 130 by way of a network, such as, but not limited to an IP network and/or a wireless telecommunications network. The network may include, without limitation, one or more local networks (LANs) and/or wide area networks (WANs). Such networking environments are commonplace in offices, enterprise-wide computer networks, intranets, and the Internet. Communications between the content delivery server 130 and the live media source 140 can use any protocol. For example, in one embodiment, communications between the content delivery server 130 and the live media source 140 might use RTSP, HTTP, or the like. In another embodiment, communications between the content delivery server 130 and the live media source 140 might use another streaming protocol, such as RTMP, PNM, MMS, or the like.

In one embodiment, the live media source 140 receives a media request from the content delivery server 130. In such an embodiment, the live media source 140 communicates a media response to the content delivery server 130 to indicate that the media request has been received and/or that the media request can be fulfilled. In response to receiving the media request, the live media source 140 provides the requested media object to the content delivery server 130. In an alternative embodiment, the live media source 140 provides a media object to the content delivery server 130 despite a media request. That is, the live media source 140 automatically delivers a media object to the content delivery server 130 when a live broadcast occurs even though there is not a request for the particular media object. In embodiments, the live media source 140 might reference or retrieve media data associated with the media object requested. Such media data might be stored in a data store residing within the live media source 140 or remote from the live media source 140.

The live media source 140 can disconnect from the mobile device 110, the network pause node 120, the content delivery server 130, or a combination thereof. To disconnect, the live media source 140 might establish a disconnection or initiate a disconnection (e.g., generate and communicate a disconnection packet that indicates or requests a disconnection). In some cases, a disconnection might be established or initiated upon detecting an indication to disconnect. For example, the live media source 140 might receive a disconnection packet from the content delivery server 130 that indicates a desire to disconnect. Alternatively, in some cases, a disconnection packet might be established or initiated upon the occurrence of an event, such as delivery of a last packet associated with a media object or a lapse of a time or time period (e.g., a disconnection occurs upon expiration of a specific amount of time following delivery of the last packet). For example, assume a live media source is configured to disconnect after the live media source has not delivered media data within five minutes. In such a case, upon the lapse of the five minute period, the live media source might disconnect from a content delivery server and/or generate and communicate a disconnection packet to a content delivery server.

Figure 2:
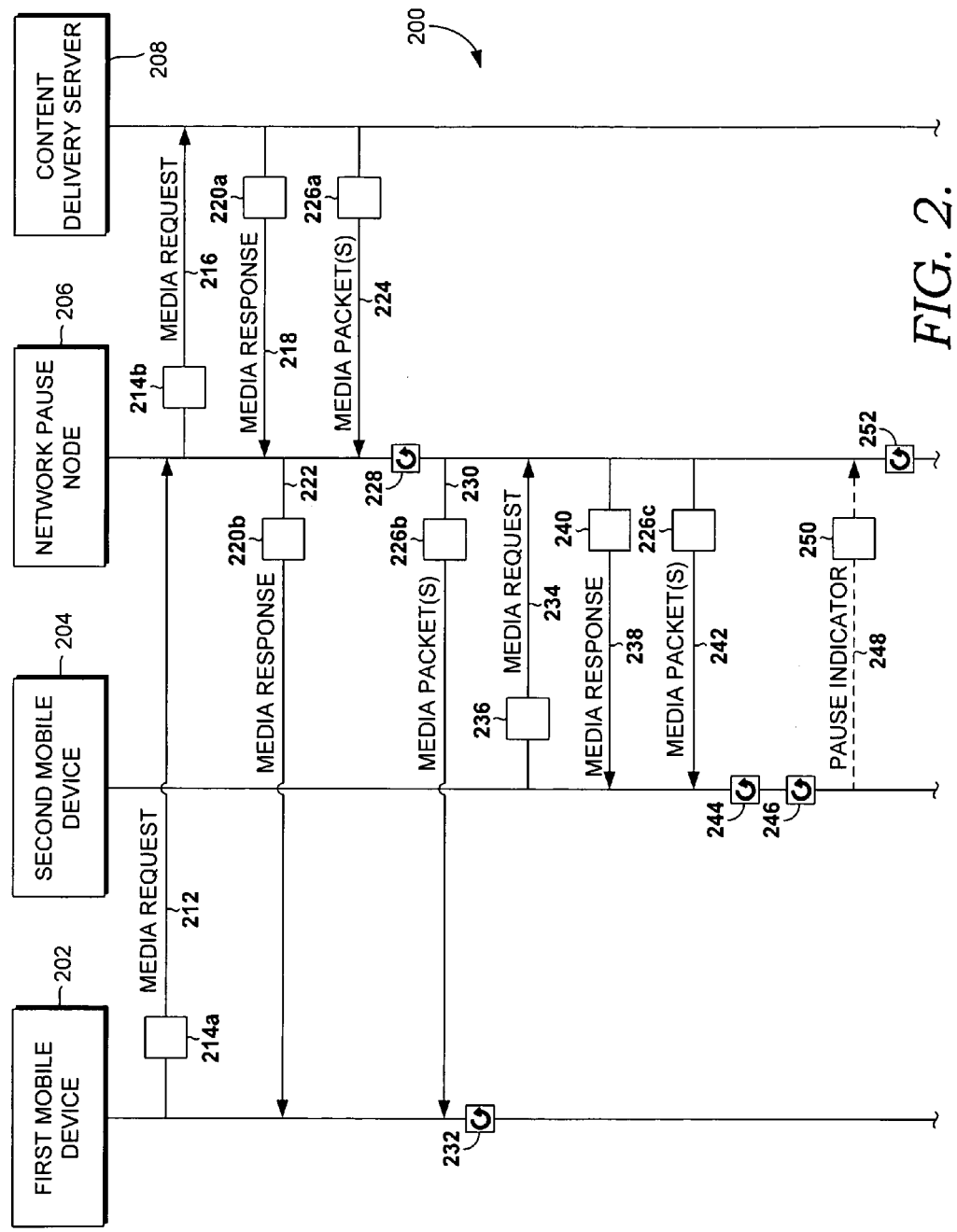
FIG. 2 depicts a flow diagram for resuming a media object presented on a mobile device following a data reduction event, in accordance with an embodiment of the present invention.
Figure 3:
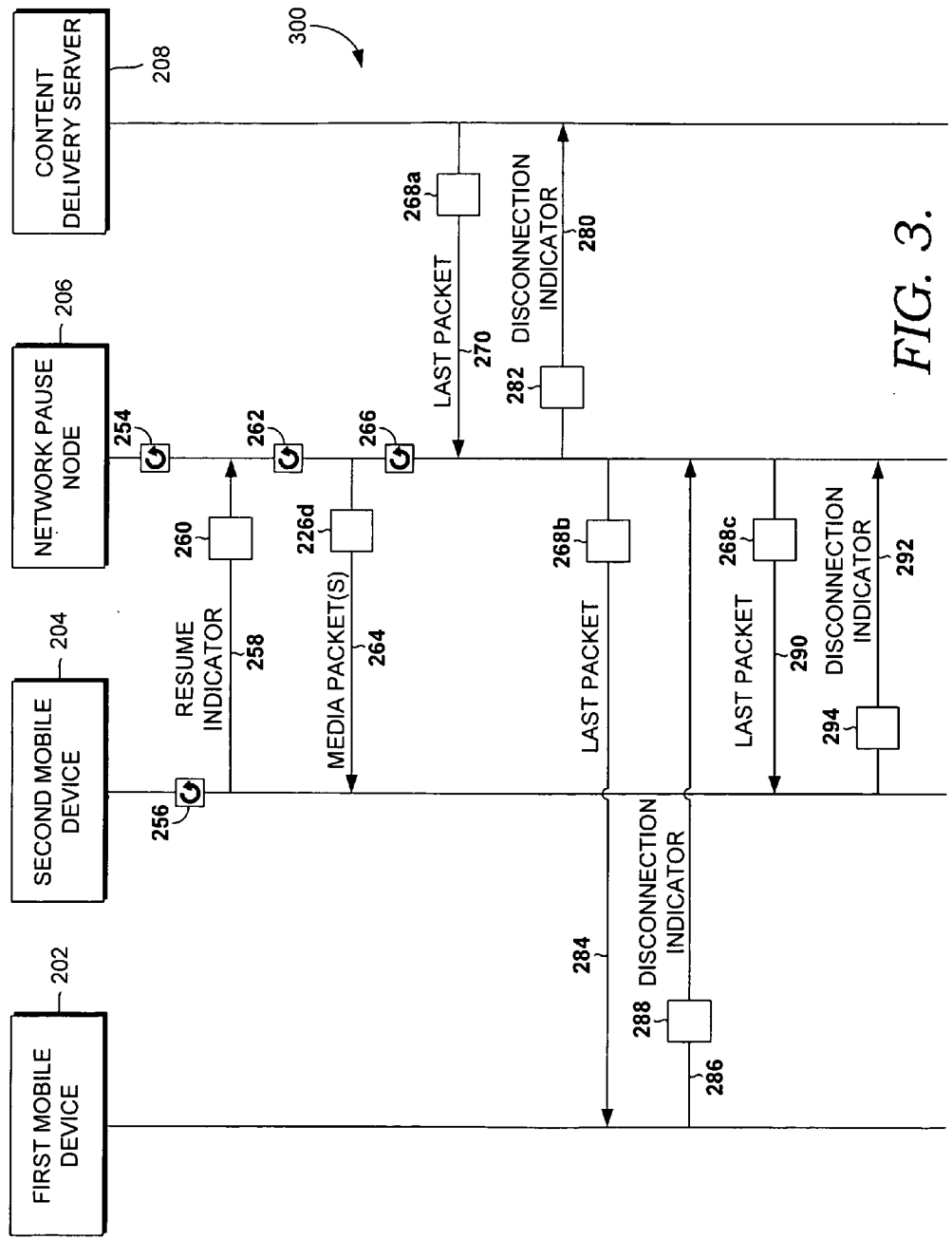
FIG. 3, a continuation of FIG. 2, depicts a flow diagram for resuming a media object presented on a mobile device following a data reduction event, in accordance with an embodiment of the present invention.

By way of example only, and with reference to FIGS. 2 and 3, an exemplary flow diagram for pausing and resuming a media object upon a data reduction event is generally depicted by numeral 200. The flow diagram includes a first mobile device, generally depicted by numeral 202; a second mobile device, generally depicted by numeral 204; a network pause node, generally depicted by numeral 206; and a content delivery server, generally depicted by numeral 208. The devices and components depicted within flow diagram 200 are comparable to the devices and components of similar name previously discussed with reference to FIG. 1.

Initially, the first mobile device 202 communicates 212 a media request 214a to request delivery, receipt, and/or presentation of a media object. The network pause node 206 receives the media request 214a. Thereafter, the network pause node 206 communicates 216 a media request 214b to the content delivery server 208 that receives the media request 214b. In response, the content delivery server 208 communicates 218 a media response 220a that indicates a confirmation or receipt of the media request 214b. In some embodiments, the content delivery server 208 communicates with a live media source to communicate a media request to the live media source such that the live media source provides the requested media object to the content delivery server. In other embodiments, a live media source delivers a media object to the content delivery server 208 without receiving a request for the media object. That is, the live media source might deliver media objects to a content delivery server despite receiving an indication that the media object is desired by a mobile device, a network pause node, or a content delivery server. The media response 220a is received by the network pause node 206. Subsequently, the network pause node 206 communicates 222 a media response 220b to the first mobile device 202.

After the content delivery server 208 receives the media request 214b, the content delivery server 208 communicates 224 one or more media packets 226a having media data associated with the requested media object to the network pause node 206. In embodiments, the content delivery server 208 receives the media data from a live media source, for example, in accordance with a request communicated from the content delivery server 208. Such media data can be delivered from the live media source via a live streaming service having a continuous stream beginning at a particular time. The one or more media packets 226a might be communicated to network pause node 206 in a continuous stream, for example, as media data is received from a live media source (e.g., in real-time). The network pause node 206 stores 228 the received media packet(s) 226a or media data associated therewith, for example, in a first-in-first-out buffer. In embodiments, the network pause node 206 stores 228 the received media packet(s) 226a, or a copy thereof, up to fulfilling the capacity of the buffer. Accordingly, after the buffer reaches capacity, the first media packet received among the stored media packets is dequeued to enable the most recently received media packet to be stored in the buffer. The network pause node 206 communicates 230 one or more media packets 226b containing media data associated with the media object to the first mobile device 202 requesting the media object. The one or more media packets 226b might be communicated to the first mobile device 202 in a continuous stream, for example, as the media data is received from the content delivery server 208. The first mobile device 202 begins presenting 232 the media object after receiving at least a portion of the media packets 226b.

The second mobile device 204 communicates 234 a media request 236 to request to delivery, receipt, or presentation of the media object to the network pause node 206. The network pause node 206 receives the media request 236a and, in response, communicates 238 a media response 240 to the second mobile device 204 that indicates a confirmation of the media request 236 and/or an ability to fulfill the request. Because the network pause node 206 stores media packets, or media data, associated with the requested media object, the network pause node 206 can begin communicating 242 one or more media packets 226c having media data associated with the media object to the second mobile device 204. In embodiments, the first media packet of the one or more media packets 226c communicated 242 to the second mobile device 204 corresponds with the first media packet received by the network pause node 206 that remains stored in the buffer (i.e., the media packet at the top of a FIFO queue). The first media packet communicated to the second mobile device 204 might be different than the media packet being sent to the first mobile device 202 (e.g., depending on the size of the buffer) and/or the media packet being sent from the content delivery server 208 to the network pause node 206 at or near the same time. Thereafter, the media packets 226c are sequentially communicated to the second mobile device 204. The second mobile device 204 begins presenting 244 the media object after receiving at least a portion of the media packets 226c.

Assume that upon presenting a portion of the media object, but prior to receiving all media data associated with the media object, the second mobile device 204 detects 246 a data reduction event. Accordingly, the second mobile device 204 automatically provides 248 a pause indicator 250 recognized by the network pause node 206 that provides an indication to pause delivery of the media object. In one embodiment, the network pause indicator is a pause request that requests to pause delivery of the media object. Alternatively, the network pause indicator is the failure of the second mobile device 204 to transmit a connection signal. Such a failure to transmit a connection signal provides an indication to the network pause node 206 to pause delivery of the media object. The network pause node 206 identifies 252 the pause indicator 250 that indicates to pause delivery.

Turning now to FIG. 3, a continuation of FIG. 2, that depicts an exemplary flow diagram for pausing and resuming a media object upon a data reduction event is generally depicted by numeral 300. The flow diagram 300 includes the first mobile device 202, the second mobile device 204, the network pause node 206, and the contract delivery server 208 previously discussed with reference to FIG. 2. In response to identifying 252 the pause indicator 250, at block 254, the network pause node pauses delivery of the media packets 226c associated with the requested media object that have not been delivered to the second mobile device 204 and increases the size of the buffer such that media data associated with the media object not yet received from the content deliver server 208 can be stored without the user missing a portion of the live media object.

Assume now that at a later time the second mobile device 204 detects 256 a completion of a data reduction event. Thereafter, the second mobile device 204 communicates 258 a resume indicator 260 to the network pause node 206. In one embodiment, the resume indicator 260 is a resume request that requests to resume delivery of the media object. The resume request might provide an indication of the media packet at which to resume delivery. In an alternative embodiment, the resume indicator 260 is a connection signal that is resumed after the data reduction event is completed. The network pause node 206 identifies 262 the resume indicator 260 that provides an indication to resume delivery of the media object. Accordingly, the network pause node 206 resumes delivery of the media object by communicating 264 one or more media packets 226d that correspond with the requested media object. In embodiments, the first media packet of the one or more media packets 226d communicated to the second mobile device 204 corresponds with the last delivered or presented media packet prior to pausing the media object. After delivery of the media object is resumed, the network pause node 206 begins reducing 266 the buffer size.

Assume now that a last media packet 268a having media data associated with the media object is communicated 270 from the content delivery server 208 to the network pause node 206. In such a case, the network pause node 206 provides 280 a disconnection indication 282 to the content delivery server 208 to disconnect or initiate a disconnection between the two components. The network pause node 206 also communicates 284 the last media packet 268b to the first mobile device 202. In response, the first mobile device 202 provides 286 a disconnection indication 288 to the network pause node 206 to disconnect or initiate a disconnection between the two components. At a later time, the network pause node 206 communicates 290 a last media packet 268c to the second mobile device 204. In response, the second mobile device 204 provides 292 a disconnection indication 294 to the network pause node 206 to disconnect or initiate a disconnection between the two components.

Figure 4:
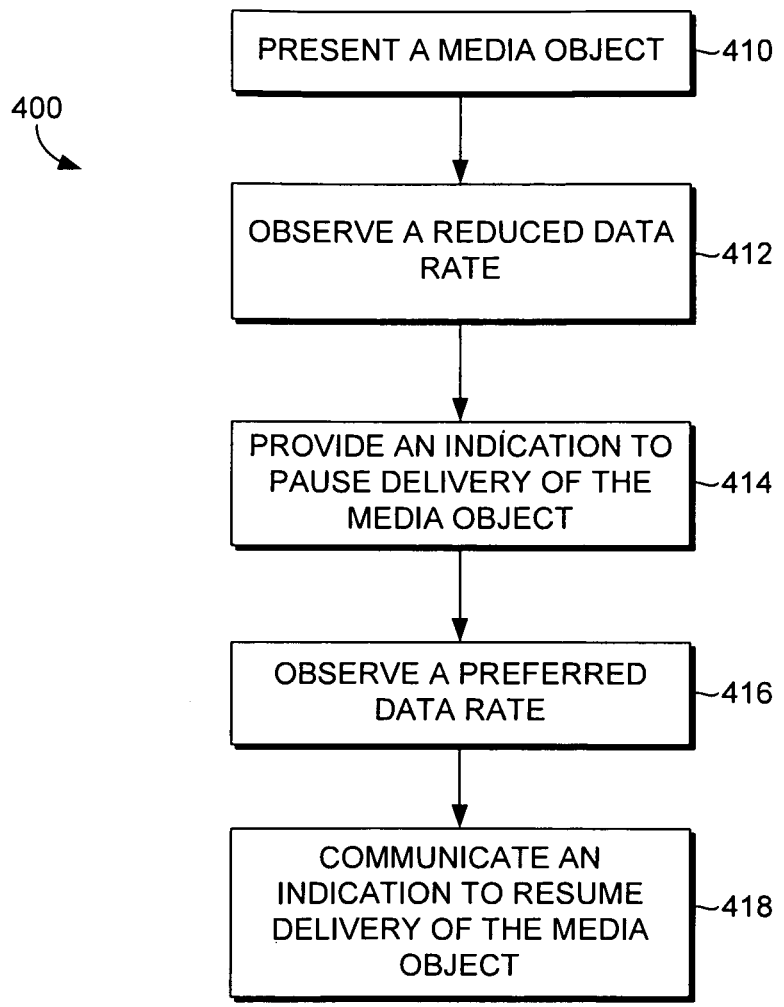
FIG. 4 illustrates a method for resuming delivery of a media object to a mobile device upon a data reduction event, in accordance with an embodiment of the present invention.

With reference to FIG. 4, in accordance with an embodiment of the present invention, an exemplary method 400 for pausing and resuming delivery of a media object to a mobile device upon a data reduction event is illustrated. Initially, as indicated at block 410, a media object is presented via a mobile device to a user. At block 412, a reduced data rate at which data is communicated to a mobile device is observed while a media object is being presented to a user. The reduced data rate results in an interruption of the presentation of the media object. A reduced data rate might be observed based on a receipt of one or more media packets associated with the media object out of sequence. Alternatively, a reduced data rate might be observed based on a failure to receive one or more media packets within a predetermined time period. Thereafter, at block 414, an indication to pause delivery of the media object to the mobile device is provided. In embodiments, the indication to pause delivery might be in the form of a pause request or an unsuccessful transmission of a connection signal. At block 416, a preferred data rate at which data is communicated to the mobile device is observed. Upon observing a preferred data rate, an indication to resume delivery of the media object to the mobile device is communicated. This is indicated at block 418.

Figure 5:
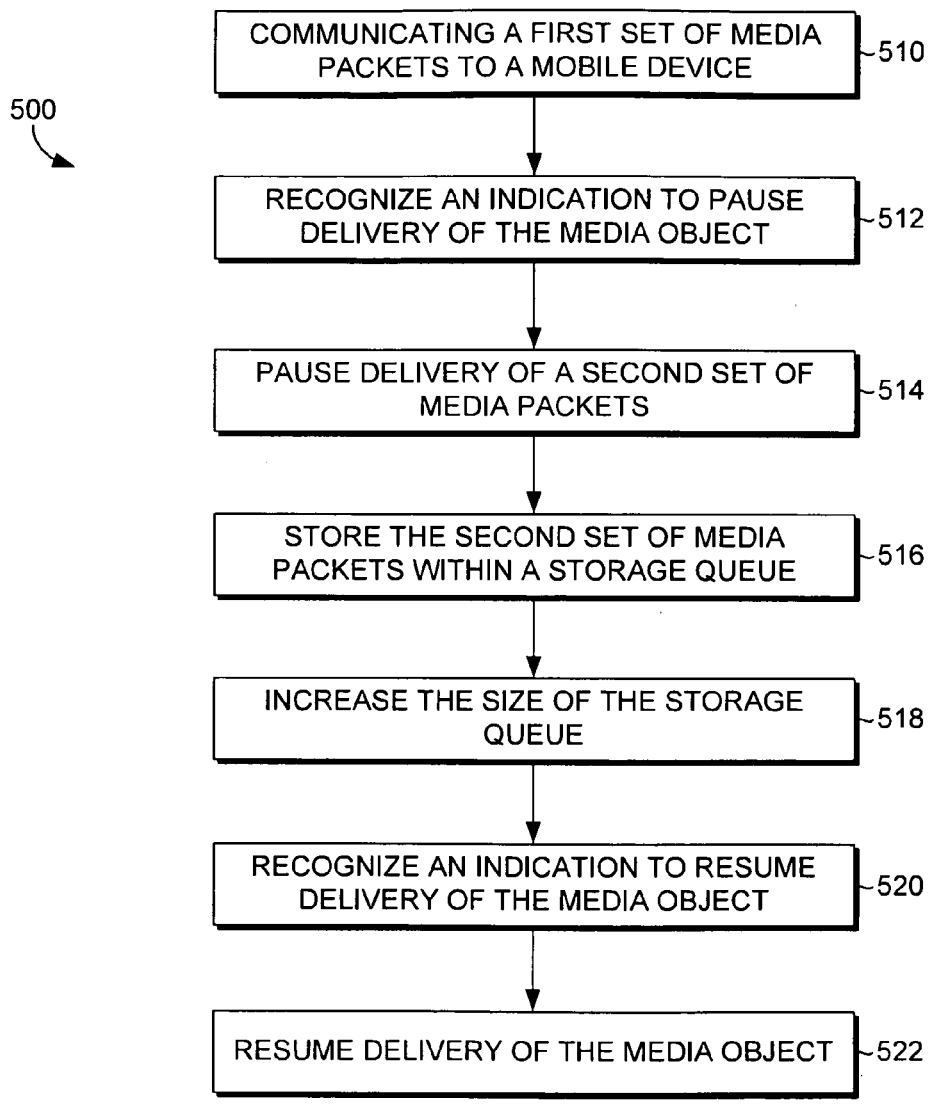
FIG. 5 illustrates a second method, according to an embodiment of the present invention, for resuming delivery of a media object to a mobile device upon a data reduction event.

Referring to FIG. 5, in accordance with an embodiment of the present invention, an exemplary method 500 for pausing and resuming delivery of a media object to a mobile device upon a data reduction event is illustrated. Initially, as indicated at block 510, a first set of media packets are communicated to a mobile device. Each of the media packets might contain media data associated with a requested media object. The first set of media packets might be provided by a live media source that delivers media objects in a continuous stream beginning at a predetermined time. Subsequently, at block 512, an indication to pause delivery of the media object is recognized. Such an indication to pause delivery might be a pause request or a failure to receive a connection signal within a particular amount of time. The indication to pause delivery might be provided by the mobile device upon the mobile device identifying a reduced data rate at which data is communicated to the mobile device. Such a reduced data rate refers to data being transferred to the mobile device below a data rate required to sufficiently support the delivery and/or presentation of the media object.

At block 514, delivery of a second set of media packets is paused based on the pause indication. Each of the media packets might contain media data associated with a requested media object. The second set of media packets, or information contained therein, is stored within a storage queue. This is indicated at block 516. At block 518, the size of the storage queue is increased. Increasing the capacity of the storage queue enables additional received media packets received to be stored.

At block 520, an indication to resume delivery of the media object is recognized. Such an indication to resume delivery might be a resume request or a successful transmission of a connection signal. The indication to resume delivery might be provided by the mobile device upon the mobile device identifying a completion of the reduced data rate at which data is communicated to the mobile device. In embodiments, the resume indication might include an indication of a point at which to begin communicating the media object. Thereafter, at block 522, delivery of the media object is resumed in accordance with the resume indication. As such, the mobile device might be able to present the media object at the point at which it was interrupted.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable media having computer-executable instructions embodied thereon that, when executed, perform a method for resuming a media object presented on a mobile device following a data reduction event that interrupts the presentation of the media object, wherein a live streaming service is utilized to deliver the media object to the mobile device via a live streaming service, the method comprising:

during the presentation of the media object, observing a reduced data rate at which data is communicated to the mobile device, the reduced data rate interrupting the presentation of the media object;

providing an indication to pause delivery of the media object to the mobile device based on the reduced data rate, the indication to pause delivery being communicated to a network pause node that stores the media object received from a content delivery server that is remote from the network pause node;

observing a preferred data rate at which data is communicated to the mobile device; and in response to observing the preferred data rate, communicating an indication to resume delivery of the media object to the mobile device.

2. The media of claim 1, wherein the reduced data rate is observed based on the mobile device receiving one or more media packets associated with the media object out of sequence.

3. The media of claim 1, wherein the reduced data rate comprises data being transmitted to the mobile device at a data rate below the preferred data rate that is required to adequately support the live streaming service.

4. The media of claim 1 further comprising identifying a point in the media object at which the reduced data rate occurred.

5. The media of claim 4, wherein the indication to resume delivery of the media object comprises a resume request.

6. The media of claim 5, wherein the resume request includes an indication of the point in the media object at which the reduced data rate occurred.

7. The media of claim 1, wherein the indication to resume delivery of the media object comprises a successful transmission of a connection signal.

8. The media of claim 1 further comprising pausing the presentation of the media object.

9. The media of claim 1, wherein the indication to pause delivery of the media object comprises a pause request or an unsuccessful transmission of a connection signal.

10. The media of claim 1 further comprising resuming delivery of the media object to the mobile device.

11. The media of claim 1, wherein the media object is provided by a live media source that provides the media object at a predetermined time and is delivered in a continuous stream to the mobile device that temporarily stores the media object and begins presenting the media object upon receiving at least a portion of the media object.

12. One or more non-transitory computer-readable media having computer-executable instructions embodied thereon that, when executed, perform a method for resuming a media object presented on a mobile device following a data reduction event that interrupts the presentation of the media object, wherein a live streaming service is utilized to deliver the media object to the mobile device, the method comprising:
   pausing delivery of the media object to the mobile device upon receiving from the mobile device an indication to pause delivery of the media object;
   increasing a capacity of a storage queue to accommodate storage of a portion of the media object received while delivery of the media object to the mobile device is paused;
   receiving an indication to resume delivery of the media object to the mobile device, the indication including a point within the media object at which to resume delivery; and
   communicating the media object in accordance with the indication to resume delivery of the media object.

13. The media 12, wherein the media object is delivered in a continuous stream to the mobile device that temporarily stores the media object.

14. The media 12 further comprising receiving the media object from a content delivery server, the content delivery server receiving the media object from a live media source that provides the media object at a predetermined time.

15. The media 12, wherein the indication to pause delivery of the media object comprises a pause request or an unsuccessful transmission of a connection signal.

16. The media 12, wherein an algorithm is used to determine the capacity to which the storage queue is to increase.

17. The media 12, wherein the indication to resume delivery of the media object comprises a resume request or a successful transmission of a connection signal.

18. The media 12, wherein the media object comprises a video media object, an audio media object, or a combination thereof.

19. The media 12 further comprising reducing the capacity of the storage queue after delivery of the media object resumes.

20. One or more non-transitory computer-readable media having computer-executable instructions embodied thereon that, when executed, perform a method for resuming a media object presented on a mobile device following a data reduction event that interrupts the presentation of the media object, wherein a live streaming service is utilized to deliver the media object to the mobile device, the method comprising:
   communicating a first set of one or more media packets containing media data associated with the media object from a network pause node to the mobile device, the first set of one or more media packets provided by a live media source that delivers the media object in a continuous stream beginning at a predetermined time;
   receiving a pause request from the mobile device that provides an indication to pause delivery of the media object, the mobile device communicating the pause request upon recognizing a reduced data rate at which data is communicated to the mobile device that is below a data rate required to adequately support the presentation of the media object;
   based on the pause request,
      pausing delivery of a second set of one or more media packets containing media data associated with the media object, the second set of one or more media packets being provided by the live media source,
      storing the second set of the one or more media packets within a storage queue of the network pause node, and
      increasing a size of the storage queue to accommodate additional media packets received by the network pause node;
   receiving a resume request from the mobile device that provides an indication to resume delivery of the media object to the mobile device, the mobile device communicating the resume request to the network pause node upon a completion of the reduced data rate, the resume request including an indication of a point at which to begin communicating the media object; and
   based on the resume request, resuming delivery of the media object by communicating the second set of the one or more media packets to the mobile device so that the mobile device can present the media object at the point at which it was interrupted.

* * * * *